US005398149A

United States Patent [19]

Weil

[11] Patent Number: 5,398,149

[45] Date of Patent: Mar. 14, 1995

[54] HOSPITAL BED POWER MODULE

[75] Inventor: Paul R. Weil, Lawrenceburg, Ind.

[73] Assignee: Hill-Rom Company, Inc., Batesville, Ind.

[21] Appl. No.: 53,043

[22] Filed: Apr. 23, 1993

[51] Int. Cl.[6] .................... H02H 3/00

[52] U.S. Cl. .................... 361/50; 361/42; 361/45

[58] Field of Search .................... 361/42, 45, 50, 77; 324/51; 5/624

[56] References Cited

U.S. PATENT DOCUMENTS 3,678,519 7/1972 Szucs .................... 5/62

3,845,355 10/1974 Lawson .................... 361/55

3,917,979 11/1975 Volk, Jr. .................... 361/50

4,083,041 4/1978 Bennice .................... 361/50

*Primary Examiner*—Marc S. Hoff

*Assistant Examiner*—S. W. Jackson

*Attorney, Agent, or Firm*—Wood, Herron & Evans

[57] ABSTRACT

A hospital bed electrical power module for powering external medical devices directly from the bed includes electrical isolation circuitry connected to prevent external device leakage current from traveling through the bed frame. The power module reduces the risk of shock to the patient due to the leakage current of the external device.

18 Claims, 2 Drawing Sheets

HOSPITAL BED POWER MODULE

FIELD OF THE INVENTION

This invention relates generally to hospital beds. Specifically, it relates to a hospital bed electrical power module for powering external medical devices directly from the bed.

BACKGROUND OF THE INVENTION

Patients that require critical care in a hospital or other medical facility are often in a bed surrounded by various electronic monitoring and lifesupporting devices used to monitor their progress and assist their recovery. These devices may include such equipment as ventilators, intra-venous (I.V.) pumps, and cardiac monitors, among various other devices, and may sometimes include a computer terminal and automated nurse information system to readily supply information about the patient to the medical staff. All of these devices must be supplied with electrical power by some means.

Normally, each critical care device has a power cord which is plugged into a wall or floor outlet in close proximity to the hospital bed containing the patient. Oftentimes, when the head of the hospital bed abuts against a wall, the medical devices must be placed at the foot of the bed to leave room on the bed sides, referred to as point-of-care zones, for medical personnel to attend to the patient. In such a scenario, the power cords that extend between the wall and each necessary device at the foot of the bed collectively clutter the floor area in the point-of-care zones. These cords possibly can become tangled around the bed or cause an impediment to medical personnel working in the point-of-care zones.

Additionally, in a critical care situation, it is often necessary for the patient to be moved quickly into another room within the medical facility to gain access to necessary life-sustaining or monitoring equipment which is either too cumbersome to be mobile or is too expensive for the hospital to have a unit for each critical care patient. When such a situation arises, the medical personnel must usually unplug all of the support devices, gather all the associated power cords together, arrange the cords into a manageable movable group, and move the patient and the devices to a different area where the devices all must again be plugged into a wall or floor power source. This slows down the patients' movement and increases the manual workload for hospital personnel who should be focusing upon the patient. Additionally, a large number of people are necessary to move a patient requiring many monitoring devices because the monitoring or other life-supporting devices are usually powered by a wall or floor power source and are normally moved independent of the bed and patient.

Other problems arise when the patient is moved to a room where the number of wall or floor outlets within the vicinity of the bed is not sufficient to support the number of life-support devices which the patient needs. In such a situation it becomes necessary to use an extension cord to reach an outlet located outside the vicinity of the bed. This, in turn, further increases the cord clutter around the bed and the possibility of unplugging a power cord.

Many critical care beds are electrically motorized so that the patient or medical attendant may adjust the position of the bed by a remote switch or control. The beds are powered by a cord which runs from a wall or floor outlet to the bed. Since the beds are receiving power for the motorized position control units, one proposed solution to the problem of too few electrical outlets around a bed for the necessary devices and the problem of power cord clutter is to have several electrical outlets located somewhere on the hospital bed frame which are powered by the A.C. power running to the bed for the position control unit. Power outlets located at the foot of the bed frame would reduce the number of cords that clutter the point-of-care zones around the bed. Unfortunately, using the bed essentially as an extension cord increases the risk of shock to the patient due to the increased amount of load current that is being drawn through the bed circuitry to power the support devices. Ironically, this increased shock hazard is the result of a protective wiring scheme used on many hospital bed frames to reduce the risk of electrical shock to a patient from the bed control circuitry.

Normally, to protect patients from receiving an electrical shock when they come into contact with a motorized hospital bed, the frame of the bed is connected to earth ground at the wall or floor power source. Grounding the frame reduces the possibility of a dangerous electrical potential developing on the frame and, consequently, reduces the risk of shock to the patient because the earth ground will draw off any excess charge from the frame. However, in the three-wire configuration utilized in the electrical systems of most commercial buildings, including hospitals, the earth ground wire is normally connected to a neutral wire somewhere in the system, while a hot or "live" wire supplies power at the outlet. The hot, neutral and ground wires run essentially adjacent and parallel along their lengths throughout the building, and therefore, the three conductors are insulated from each other by a plastic or rubberized coatings to prevent shorting between the conductors. However, due to the imperfect insulation qualities of the coatings, and the imperfect isolation of charge in the medical devices that are drawing current from the wires, a certain amount of undesirable leakage current develops on the neutral wire as it is conducting electricity. That is, current leaks through the insulation onto the neutral wire from the hot wire and through the electrical components and circuitry of the bed and medical devices on the neutral wire. Since the earth ground wire is electrically connected to the neutral wire, the earth ground wire also carries this leakage current. As a result, the hospital bed frame develops a leakage current thereon because it is grounded to the power supply ground or building earth ground, and this current presents a risk of shock to a patient in the bed.

Usually, in a motorized hospital bed, the only leakage current that is of any magnitude is associated with the bed position controls and motors. This current is kept to a minimum by appropriate circuitry design. However, connecting of other medical devices to the bed frame to draw power through the bed power supply increases the leakage current on the bed frame to an unsafe level because these external devices are not optimally designed to prevent leakage current. It only takes a very low current flow, essentially a current in the milliampere range, to disrupt the normal beating of the human heart. While the possibility of shock is undesirable with any patient, the situation becomes especially acute with critical care patients with heart conditions. Additionally, the more critical patients require a large number of monitors and life-sustaining devices, and each additional electronic support device which is supplied with power through the bed power supply increases the leakage current and increases the risk of shock to the patient. Underwriters Laboratories medical specifications require that the leakage current on a hospital bed frame be below 100 microamperes for motorized critical care beds. However, while the leakage current associated with the bed position controller may be contained below this range by the bed designers, this low current may not be achievable with currently available beds when additional monitoring and support devices are powered from the bed power supply because the manufacturers of the external medical devices are not necessarily concerned with leakage current.

Therefore, there has always been a tradeoff between eliminating the clutter of power cords and electrical connection equipment around the bed and reducing the likelihood of electrical shock to the patient. As may be appreciated, the health of the patient is paramount, and therefore, tidiness and efficiency around the bed may have been sacrificed in order to achieve a lower amount of leakage current in the bed frame.

Furthermore, approximately 70% of all the life-support and monitoring equipment used by the patient while the bed is stationary, must have power when the patient and hospital bed are in transit between rooms. In the past, each device has been powered apart from the bed and has had to have an internal power supply for when the cord is unplugged from the wall. The internal supplies increase the weight and cost of the device and are subject to expiring at different times. It is thus desirable to supply all of the external medical devices with power when the main bed power cord has been removed from the wall or floor outlet and the patient and bed are moving between rooms.

Consequently, it is an objective of the present invention to electrically power various life-support and monitoring devices directly from the hospital bed frame to reduce the necessary power cords and electrical connections at a wall or floor source.

It is further an objective of the present invention to provide outlets on the bed frame which supply both A.C. and D.C. power for the various external monitoring and support devices that are normally located around a critical care hospital bed.

It is still further an objective of this invention to reduce the power cord clutter around the hospital bed in the "point-of-care" zones where the medical personnel must move to attend to the patient.

It is yet another objective of the present invention to provide an uninterrupted power supply to external medical devices while the bed is in transit and the main bed power cord has been unplugged.

It is still a further objective to allow the integration of monitoring and support equipment onto the frame of the bed to be powered by the bed to reduce the large number of medical personnel currently necessary to move a patient in the bed from room to room.

It is yet another objective to achieve all of the above objectives without increasing the leakage current on the bed frame and consequently increasing the chance of shock to a patient.

SUMMARY OF THE INVENTION

In accordance with the objectives of this invention, a hospital bed power adapter module is provided which electrically isolates any life-support and monitoring medical devices which are plugged into the module so that leakage current from these devices does not reach the main bed power supply, and consequently, the bed frame. As a result, numerous external medical devices may be powered directly from the bed frame power supply using the adaptor module without causing an increase in the amount of leakage current on the frame and an increased chance of shock to a patient.

The power adaptor module includes a transformer that is connected on its primary side to the bed power supply. The secondary side of the transformer supplies the plug receptacles of the adaptor module with the necessary A.C. voltage for powering any external medical devices. The electrical isolation between the bed frame and the external medical devices is achieved because the hot and neutral wires of the bed main power supply are electrically connected to the primary side of the transformer of the module and the hot and neutral wires for the output power of the module are electrically connected to the secondary side of the transformer. The earth ground wire of the module is connected to the power supply earth ground, but not to the neutral wire of the module output. In this way any leakage current developed in the external medical devices and in the output of the power module does not reach earth ground or the neutral wire of the bed main power supply. Consequently, the bed frame receives very little, if any, of the leakage current associated with the external medical devices. The monitoring and support devices can thus be powered through the adaptor modules and the only leakage current in the bed frame is essentially the normal leakage current associated with the motorized bed control which has been safely minimized through design.

The present invention further comprises a circuit breaker installed in line on the primary side of the transformer to shut off power to the power adaptor module upon detection of an electrical short circuit or malfunction in a support device connected to the module. A ground loss detector and current meter are also included in the power module of the present invention and are connected to the primary side of the isolation transformer in the module to detect the possible loss of ground potential at the bed frame and to monitor the amount of load current drawn by the monitoring and support devices, respectively.

The power adaptor module supplies power to plug receptacles which may be placed anywhere on the bed frame so as to facilitate an easier connection of an external medical device to the power source. As a result, individual power cords for each medical device do not have to run to wall and floor outlets and the cords may be decreased in length because they connect directly to the bed frame receptacles. This, in turn, reduces the cord clutter in the patient's point-of-care zones. Additionally, the availability of plug receptacles on the bed frame reduces the possibility that there will not be enough power receptacles for the equipment in the vicinity immediately surrounding the bed.

The present invention further includes a D.C. power supply which converts the A.C. power from the transformer into D.C. power. Receptacles are also provided to receive D.C. plugs and provide D.C. current for those devices which require a direct current power supply, such as some commercially available I.V. pumps. The power adaptor module of the present invention further includes a battery and an associated battery charger which are also supplied from the transformer. The battery stores charge and is used to supply power from the adaptor module to the external medical devices when the patient and the bed are in transit between hospital rooms and the main bed power cord is unplugged from the wall. The battery can be made to deliver either A.C. or D.C. power, or both, as is required by different external medical devices. The battery charger is connected to the battery to charge the battery when the main bed power supply is plugged into a floor or wall outlet while the bed is stationary in a room. By supplying power directly from the bed frame, various monitoring and support devices may be physically integrated with or built onto the bed frame to move with the bed frame. In this way, the present invention reduces the number of the medical personnel necessary to move the patient, bed, and external devices.

Therefore, the hospital bed power adaptor module of the present invention presents a device which powers the various external monitoring and support devices used by the patient directly from the bed frame, while not substantially increasing the amount of leakage current on the frame of the bed. The present invention also achieves a substantial decrease in the amount of power cord clutter in the patient point-of-care zone around the bed and reduces the possibility of having too few electrical outlets around a bed. Hospital personnel moving a patient from room to room do not have to worry about gathering up and dragging various long power cords, or about locating enough power outlets in the new area to power the necessary medical devices. The availability of both A.C. and D.C. power from the adaptor module means that the bed can power a large variety of external medical devices, and it allows the integration of various pieces of medical equipment onto the bed frame. The battery storage source in the adaptor module provides uninterrupted power to the devices during transit of the bed without the necessity of having each device contain its own individual internal power supply. The battery source provides uninterrupted reliable power to the devices during transport and eliminates any "down-time" of the devices when the main bed power cord is unplugged from the wall prior to transportation. The reduction in size and weight of the external devices due to the elimination of the need for individual internal power supplies allows integration of many external devices directly onto the frame of the bed. This, in turn, reduces the number of medical personnel and the amount of time necessary to move a patient. With the present invention, a nurse or other medical staff person only needs to unplug one cord from the wall, move the bed frame powering the devices and plug the cord back into an outlet at the new destination of the patient.

The present invention will more revealingly be understood during the following detailed description with reference to the drawings herein, in which:

DETAILED DESCRIPTION OF THE INVENTION

Figure 1:
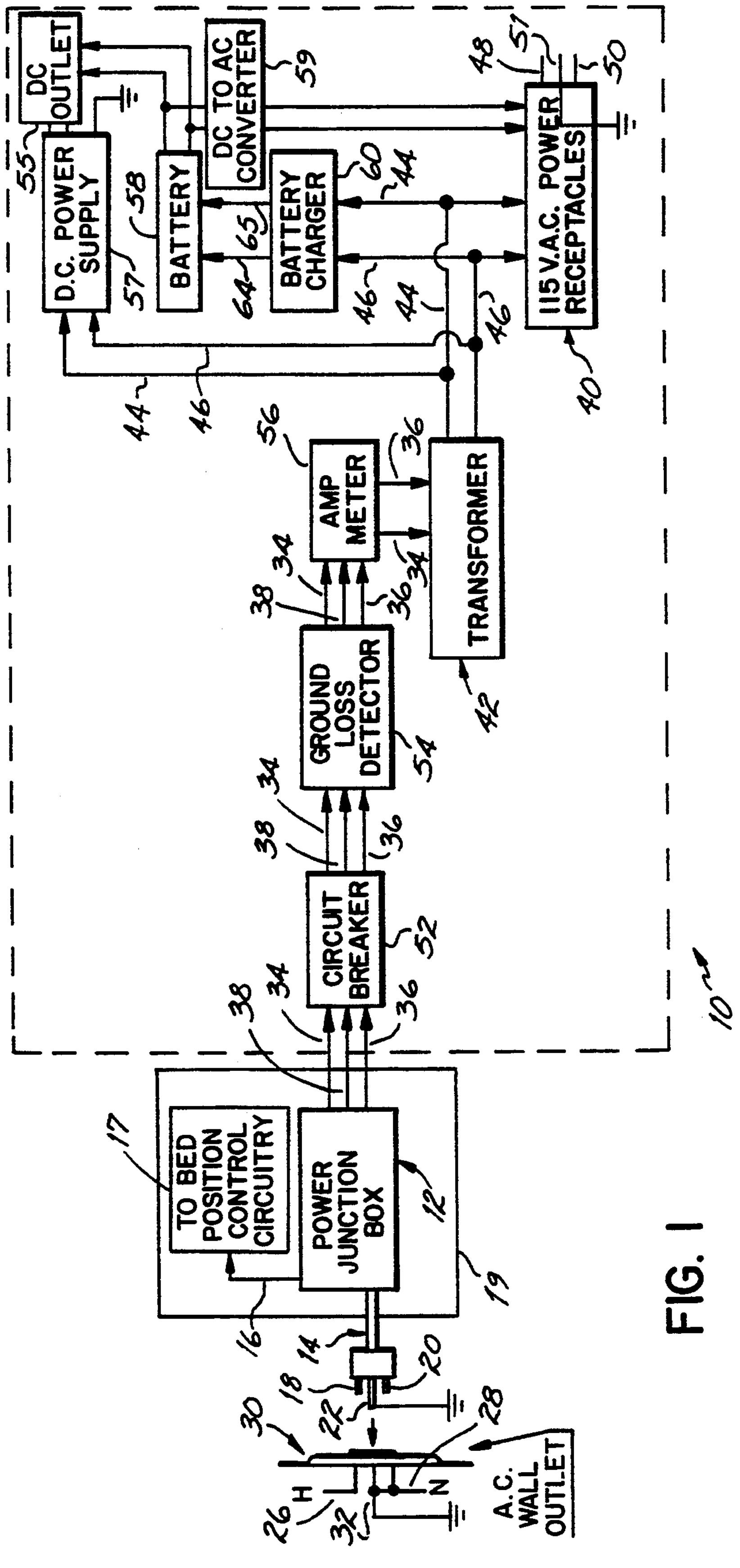
FIG. 1 shows a schematic diagram of the hospital power module of the current invention, FIG. 2(*a*) is a diagrammatic view of the point-of-care zones around a currently existing hospital bed illustrating power cord clutter.

Referring to FIG. 1, the hospital bed power adaptor module 10 of the present invention is shown directly coupled to the head end power junction box 12, of a currently available hospital bed. Power is supplied to junction box 12 by a three-wire power cord 14 which is plugged into an A.C. power outlet 30 in a wall or floor of the hospital. The junction box 12 supplies power directly to the bed's position motors and control circuitry 17 through line 16 so that the bed can be moved into various positions by a patient or medical personnel. The outlets 30 in a commercial building, such as a hospital, contains a hot or "live" wire 26 which is usually maintained at a potential between 110 and 120 volts. The outlets also contain a neutral wire 28 maintained at approximately 0 volts and a ground wire 32 or "earth" ground wire that is physically connected to the physical earth or to the foundation of the building, so as to maintain a potential of zero volts or "ground". The ground wire 32 of the building is normally electrically connected to the neutral wire 28 to stabilize the power supply. This connection normally takes place at the building's main junction box or somewhere earlier in the electrical system before the wall and floor outlets 30. The three-wire input power cord 14 which connects junction box 12 to the electrical outlet 30 of the hospital building also contains a hot or "live" wire 18, a neutral wire 20, and a ground wire 22. The ground wire 22 of a power cord 14 is normally connected to any metal or other electrically conducting surfaces or parts that come into contact with the user of a particular electrical device. Should any charge build-up on these surfaces or should the hot wire 18 short circuit to these surfaces, the earth ground insures that the charge is drained or grounded away thereby preventing shock to the user.

When patients or medical personnel contact the bed position control circuitry 17 to move the bed, there is a risk of shock. Traditionally, the way to reduce this shock hazard is to connect the bed frame 19 to ground wire 22 of cord 14. When cord 14 is plugged into outlet 30, the frame is grounded through wire 32 and any dangerous voltage which builds up on frame 19 is drained away through the ground connection, thus maintaining frame 19 at 0 volts electrical potential. The risk of shock is therefore reduced. However, because the wiring in the outlets 30 of the hospital employs a connection between the earth ground wire 32 and the neutral supply wire 28, another shock risk arises when an electrically powered hospital bed with a grounded frame 19 is plugged into such an outlet 30.

Inherently, when power is applied to or drawn through cord 14 to supply a bed, a certain amount of leakage current develops on ground lines 22 and 32 as well as on neutral lines 20 and 28. The leakage current is the result of imperfect insulation and resulting capacitance coupling or parasitic capacitance between the hot or phase lines 26, 18 and the ground lines 22, 32 and neutral lines 20, 28 both in the wall circuitry and in cord 14. The leakage current develops on the neutral lines 20, 28 and also, consequently, on the ground lines 22, 32 because of the connection between the neutral wire 28 and earth ground 32 in wall power supply before outlet 30. Essentially, due to the wall connection of earth ground 32 and neutral line 28, the ground line 22 is electrically sensed by the circuit as a power return line similar to the neutral line 20. Therefore leakage current develops on the ground line 22 similar to the way it develops on neutral line 20. While the leakage current between phase line 18 and neutral line 20 is essentially considered as loss in the circuit, the leakage current on the ground line 22 presents an undesirable condition. Because the frame 19 of the bed is connected to ground wire 22, any leakage current which develops on the ground wire 22 is, in effect, transferred to the bed frame 19. Consequently, any increase in the amount of leakage current that is coupled to ground wire 22 increases the amount of leakage current which appears in the bed frame 19, and consequently, increases the risk of shock to the patient.

Figure 2A:
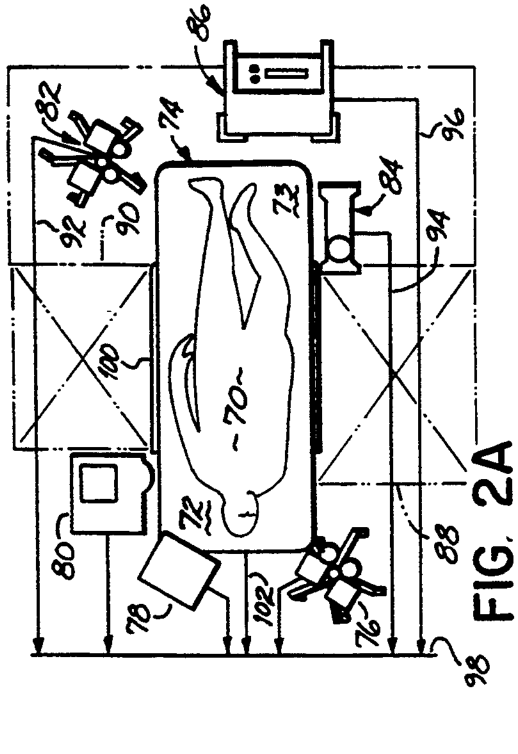
FIG. 2(*b*) is a diagrammatic view of the point-of-care zones around a hospital bed equipped with the present invention illustrating the reduced cord clutter.
Figure 2B:
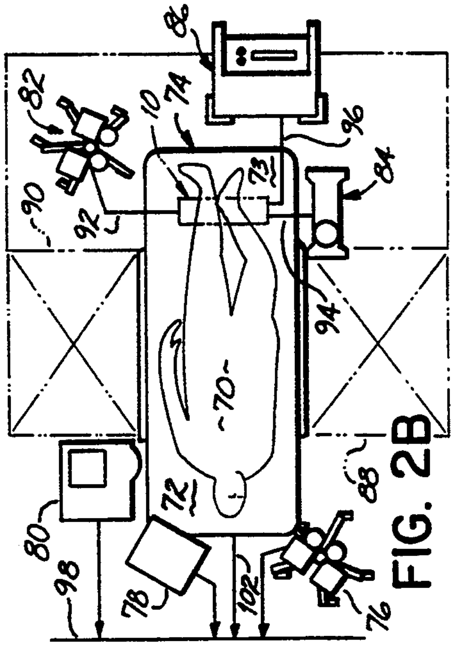

Hospital patients, especially critical care hospital patients, are often physically connected to various external monitoring and life-support devices located around their bed to promote their recovery and monitor their condition. Most of these devices are electrically operated and must be connected to a power source in some way. Traditionally, this way consists of plugging the power cord of a particular device into an outlet in the wall or floor of the hospital. Referring now to FIG. 2(*a*), it is seen that when several external medical devices are needed to monitor and assist the patient 70, not all of these devices can fit at the head 72 of the bed 74. While there may be room for devices such as I.V. pump 76, cardiac monitor 78, and ventilator 80 at the head end 72 of bed 74, other devices such as additional I.V. pump 82, a patient warming/cooling unit 84 and an aortic balloon pump 86 must be placed at the foot end 73 of bed 74. Shown in FIG. 2(*a*), are two areas, 88 and 90, on either side of bed 74 which are considered patient point-of-care zones. In these zones, the medical personnel move and attend to the patient 70 in bed 74. When devices are placed at the foot of bed 74, the associated power cords, 92, 94, and 96, from devices 82, 84 and 86 respectively cross the point-of-care zones 88 and 90 on their way to wall 98 at the head end 72 of the bed 74. These cords 92, 94 and 96 cause substantial clutter in the point-of-care zones 88 and 90 and create a danger that the attending medical personnel will trip on the cords, injuring themselves or the patient 70 should they fall on the patient. Furthermore, injuries may be caused to the patient due to cords 92, 94 or 96 may be subject to being pulled from the wall and the associated medical equipment being de-energized.

It has been proposed to solve the problem of power cord clutter by placing power plug receptacles on the frame 100 of bed 74 so that external devices such as I.V. pump 82, warming/cooling unit 84 and aortic balloon pump 86 may be plugged directly into the foot of bed frame 100 thereby keeping their associated power cords 92, 94 and 96 from stretching across the point-of-care zones 88 and 90. These receptacles would be powered by line 102 which connects directly to the bed frame 100 and supplies power to the remote position controller (not shown) of the bed 74. However, each external medical device produces a certain amount of internal leakage current on its ground line if the ground line of the device is connected to the wall power and the neutral line 28. Any leakage current on the ground line 22 is transferred onto bed frame 100, thus increasing the likelihood of electrical shock to the patient or other person touching the bed frame 100. To prevent such an accumulation of leakage current from external devices, the devices were not connected to bed power, but were instead connected directly to the wall using extension power cords when necessary. Therefore, in the past, medical personnel have had to deal with a large number of extension cords spanning across the point-of-care zones 88 and 90 so that power could be supplied to the external medical devices, in order to reduce the risk of shock to the patient 70.

Referring again to FIG. 1, the power adaptor module 10 of the present invention is electrically connected to the power junction box 12 of the bed through input lines 34, 36 and 38, which electrically communicate with lines 18, 20, and 22, respectively of cord 14. Therefore, A.C. power is coupled to the present invention through hot line 34, neutral line 36, and ground line 38 and cord 14 which plugs into wall outlet 30. Through receptacle 30, the neutral line 36, and ground line 38 are electrically coupled to the frame of the bed because of the grounding of neutral line 28 at the wall outlet 30. Therefore, any leakage current on ground line 38 is transferred to bed frame 19.

The output A.C. power of the adaptor module 10 is produced at a series of power receptacles 40 into which various power cords from external medical devices (not shown) are plugged. Power adaptor module 10 accomplishes an electrical isolation between the bed frame 19 and the external medical devices so that very little, if any, leakage current associated with the external monitoring and life-support devices appears on frame 19 to increase the risk of electrical shock to the patient. Power adaptor module 10 accomplishes this electrical isolation by using a transformer 42 which is placed between the input power lines 34 and 36, and the output power receptacles 40 which supply power to the external devices. Since input line 34 is electrically coupled to power cord line 18, line 34 is electrically hot and is at approximately 110–120 volts potential. Similarly, line 36 is at OV potential, and line 38 is grounded to earth ground. To maintain an easier understanding of the FIG. 1, the wires between transformer 42 and power junction box 12 the power lines will have the same designations of 34, 36, and 38 between each component 52, 54, and 56 (explained below). The hot and neutral wires 34 and 36 supply power to the primary side of the transformer 42. Power is coupled through transformer 42 and the power output on the secondary side of the transformer 42 is produced at hot line 44 and neutral line 46 which supplies power receptacles 40 with, preferably, the same A.C. voltage that appears at the input lines 34 and 36 to the transformer 42. Similarly, the power receptacles 40 have a hot output line 48 and a neutral output line 50 which supplies A.C. power to external devices through an appropriate cord and plug assembly (not shown). The power receptacles 40 may also have an earth ground connection 51 that is coupled to earth ground 32 at wall outlet 30. However, the ground lines to the external devices will not be coupled to neutral line 46. In this way, any leakage current which develops as a result of the external devices appears only on neutral line 46 on the transformer secondary side and is thus electrically isolated from the input ground line 22, and bed frame 19. The transformer is preferably chosen so that any back leakage current from the secondary side to the primary side of transformer 42 is minimal, in the order of approximately 10–20 microamperes. Therefore, the external devices powered by receptacles 40 are effectively isolated from the wall power and bed frame 19. The external devices may have chassis or frame ground connections 51 that are coupled to the wall ground 32 through receptacle 40. However, because the ground line 51 is not connected to the neutral power line 46 of the adaptor module 10, the ground line 51 does not acquire leakage current from phase line 44 of the module and thus does not contribute to the leakage current on bed frame 19, Referring now to FIG. 2(*b*), with I.V. pump 82, warming/cooling unit 84, and aortic balloon pump 86 plugged into the power adaptor module 10 of the present invention which is connected to bed frame 100, the point-of-care zones 88 and 90 are free of power cord clutter so that medical personnel are able to move freely in these zones. Furthermore, the reduction of the number of power cords which must be connected to wall 98 at the head 72 of bed 74 reduces the number of outlets that are necessary at the wall 98 to support all of the devices necessary to care for the patient 70. With fewer outlets 30 required at the wall 98, the need to use extension cords to power external devices from more remote plug outlets is reduced. Similarly, any concerns about transferring the patient to an area which may have a lesser number of power outlets than the previous area are also reduced.

As shown in FIG. 1, a circuit breaker 52 is utilized between power junction box 12 and transformer 42 in order to detect any large current draws by the external medical devices which would indicate a possible short circuit in one of these devices. Upon sensing a load current increase beyond the internal current limit of the breaker 52, circuit breaker 52 appropriately cuts off the power delivered to the external devices. Furthermore, in line between the power junction box 12 and transformer 42 is a ground loss detector 54 which detects the absence of an earth ground potential connection in the system and appropriately shuts down power to the external devices to prevent a shock hazard to the patient or to medical personnel. A current or amp meter 56 is also connected in line between the power junction box 12 and the transformer 42. Meter 56 monitors the load current that is being delivered to the medical devices through the power adaptor module 10. The meter may be equipped with an appropriate visual or audible indicating system which will indicate to a nurse or other hospital staff person that the current drawn through module 10 is close to the limit for the module and that any additional external devices should be powered from another power supply. Each of the devices, circuit breaker 52, ground loss detector 54 and amp meter 56 are optional devices which may or may not be included in the power adaptor module 10 to further enhance the safety of an electrical hospital bed and further reduce the risk of shock to a patient or medical personnel.

Many external monitoring and life support devices such as cardiac monitors and respirators require approximately a 110 volt A.C. power supply voltage to operate. This supply voltage can be obtained at A.C. power receptacles 40. However, other external devices, such as some I.V. pumps, require a D.C. power supply. To this end, the power adapter module 10 of the present invention includes a D.C. power supply 57 with associated D.C. outlet receptacles 55 for receiving the power cord of an I.V. pump or of any other external medical device which requires D.C. power. In this way, a hospital bed having the power adaptor module 10 of the present invention will support a large variety of monitoring and life-support equipment without the need for each piece of equipment to have individual, heavy A.C. to D.C. conversion circuitry when only the A.C. voltage from the wall outlets is available to power the external device.

Figure 3A:
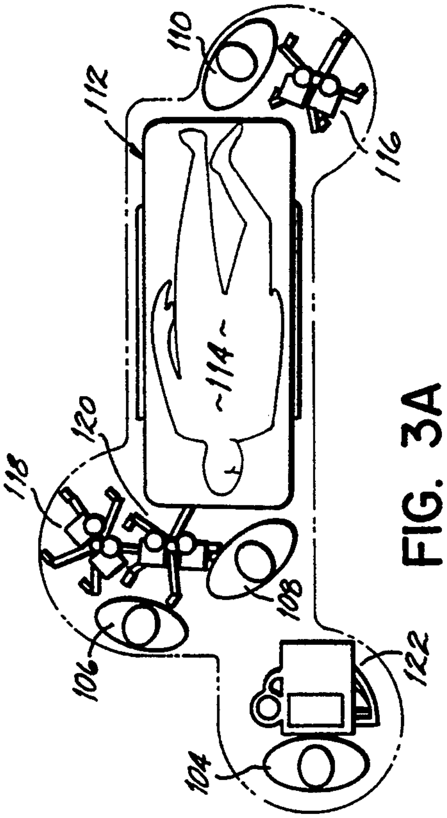
FIG. 3(*a*) is a diagrammatic view of a mobile transport profile of the bed; and a currently existing hospital bed illustrating the personnel necessary to move FIG. 3(*b*) is a diagrammatic view of a mobile transport profile of a hospital bed equipped with the present invention illustrating the reduction in personnel necessary to move the bed.
Figure 3B:
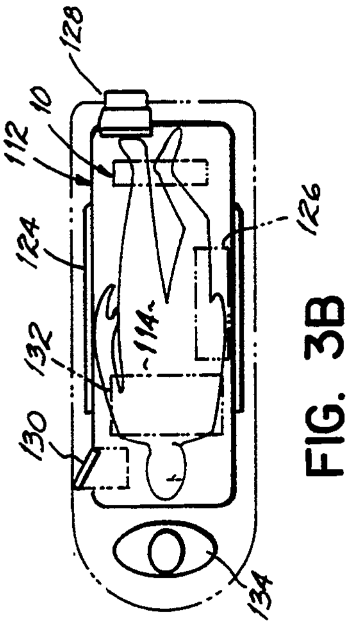

The ability to power external medical devices directly from the bed also reduces the number of people that are effectively required to transport a patient and the time necessary for such transport. Referring now to FIG. 3(*a*), when transporting a patient that requires various external monitoring and support devices, several medical personnel 104, 106, 108, and 110 are necessary both to move the bed 112 and patient 114 and to move the devices associated with the bed 112. The power cords for each device 116, 118, 120, and 122 must be unplugged from the wall power source, gathered together in manageable bundles and moved along with the patient to the new area. Approximately 70% of the devices that follow the bed 112 when the patient 114 is in transit to another area in the hospital must remain operational during the transportation. Prior to movement, the external devices are unplugged from the wall; and, therefore, each device that must remain operational during transit must have an internal power supply which can supply the needed power to the device while the patient is being transported. For each of these devices the internal power supply increases the weight and size of the device, and consequently, makes it more expensive to purchase and more cumbersome to move. Additionally, since each of the medical devices has independent internal power supplies, the supplies will run out at different times. Furthermore, with devices physically separated from the bed 112 and powered by individual wall receptacles, one person 108 is required to move the bed 112 while other personnel 104, 106, and 110 are necessary to move the devices in tandem with the bed 112 and patient 114. The number of people and the amount of space needed to move a patient in a particular bed 112 is termed the "mobile footprint" of the bed 112. It is desirable to make the mobile foot print as small as possible. As seen in FIG. 3(*a*), a bed without power module 10 and only four external devices 116, 118, 120, and 122, has a very large mobile footprint when the patient is moved.

Referring again to FIG. 1, the hospital bed power adaptor module 10 of the present invention includes a battery 58 or similar power storage device which may be used to supply power to the external devices during transport when the main bed power cord 14 is unplugged from the wall. This internal battery 58 of power adaptor module 10, which operates independently of power cord 14, eliminates the need to have a heavy, expensive internal power supply in each medical device. To charge battery 58 when the power cord 14 is plugged into outlet 30, and bed 112 is stationary, a battery charger device 60 is powered by the A.C. voltage output on the secondary side of the transformer 42. In this way, when the bed 112 is stationary in a room, the internal battery 58 is receiving a charge from battery charger 60 through lines 64 and 65, and, when the cord 14 is unplugged from the wall outlet 30, battery 58 is charged and ready to supply power to each of the external devices during transport. Battery 58 may be chosen to provide A.C. power, D.C. power or both so that the widest range of devices possible may be powered during transport. Additionally, battery 58 is coupled to the A.C. power receptacles 40 such as through an A.C. to D.C. converter 59 and is coupled to the D.C. outlet 55 so that the plugs and cords of the external devices remain plugged into the same power receptacles during transport that they use when the bed is stationary.

Referring to FIG. 3(*b*), in a bed using the power adaptor module, each of the external devices does not have to have an internal power supply, and therefore, the devices can be made smaller and lighter. The decreased size and weight of the external devices and the availability of transport power directly from the power adaptor module 10 of the present invention enables the mechanical integration of various external devices directly onto the bed frame 124 either below, on the sides, or in the front or back of the frame 124. FIG. 3(*b*) shows how a series of I.V. pumps and holding stands 126 are placed at the side of bed frame 124. Similarly, an automated nurse information terminal 128 is placed at the foot end of the bed frame 124, while a cardiac monitor 130 is placed at the head of the bed frame 124. A ventilator 132 is positioned to slide beneath the head of the bed frame 124. All of these external devices move as a unitary structure with bed frame 124 when patient 114 is moved to a different area. The power cords for each of these devices are plugged into appropriate power receptacles around the bed frame and are supplied with power by the adaptor module 10 of the present invention. As illustrated in FIG. 3(*b*), powering the devices directly from the bed using power adaptor module 10 significantly reduces the mobile footprint or transport profile of the bed 112. Thus, the bed 112 of FIG. 3(*b*) requires only one person 134 to move the patient 114, the bed 112, and all of the associated external equipment 126, 128, 130, and 132 to the new location. Although the bed frame, at times, will not be able to support all of the external devices, the use of the power adaptor module 10 still reduces the number of medical personnel necessary to move the patient.

Therefore, the hospital bed power adaptor module of the present invention presents a device which powers the various external monitoring and support devices used by the patient directly from the bed frame, while maintaining the amount of leakage current on the frame of the bed at a medically safe current level. The present invention also achieves a substantial decrease in the amount of power cord clutter in the patient point-of-care zone around the bed and reduces the possibility of having too few electrical outlets around a bed. Hospital personnel moving a patient from room to room do not have to worry about gathering up and dragging various long power cords, or about locating enough power outlets in the new area to power the necessary medical devices. The availability of both A.C. and D.C. power from the adaptor module means that the bed can power a large variety of external medical devices, and it allows the integration of various pieces of medical equipment onto the bed frame. The battery storage source in the adaptor module provides uninterrupted power to the devices during transit of the bed without the necessity of having each device contain its own individual internal power supply. The battery source provides uninterrupted reliable power to the devices during transport and eliminates any "down-time" of the devices when the main bed power cord is unplugged from the wall prior to transportation. The reduction in size and weight of the external devices due to the elimination of the need for individual internal power supplies allows integration of many external devices directly onto the frame of the bed. This, in turn, reduces the number of medical personnel and the amount of time necessary to move a patient. With the present invention, a nurse or other medical staff person only needs to unplug one cord from the wall, move the bed frame containing powering the devices and plug the cord back into an outlet at the new destination of the patient.

Having described this invention, other forms or variations thereof will be obvious to one of ordinary skill in the art. Equivalents may be substituted for elements without departing from the scope of the invention, and therefore it is intended that the invention not be limited to the particular embodiment disclosed as the best mode contemplated for carrying out this invention. The invention will include all embodiments falling within the scope of the appended claims.

I claim:

1. A hospital bed power module for use with a motorized hospital bed having motor control circuitry, the module being carried by the bed for powering, from the bed, an external medical device which is separate from the motor control circuitry, said module comprising:

input power circuitry, including a ground line, for connecting to a supply source and delivering A.C. power from said supply source to said module, the bed frame being electrically connected to said ground line;

at least one output receptacle for receiving a plug from an external medical device and coupling power from the module to the external medical device to run said medical device; and electrical isolation circuitry connected between the input power circuitry and the output receptacle to effectively electrically isolate leakage current associated with said external medical device from reaching the input power circuitry and ground line and to effectively prevent external medical device leakage current from traveling through the bed frame;

whereby external medical devices may be powered directly from a bed power supply without significantly increasing the leakage current on the bed frame and the risk of shock to the patient due to the leakage current of the external device.

2. The power module of claim 1, said isolation circuitry including a transformer having a primary and secondary side, said input power circuitry electrically connected to the primary side, said output receptacle electrically connected to the secondary side, said transformer effectively preventing leakage current from an external medical device connected to said output receptacle from reaching the ground line of said input power circuitry and the bed frame.

3. The power module of claim 2, wherein the secondary side of said transformer outputs A.C. power, said module further comprising conversion circuitry electrically coupled to said secondary side to convert A.C. power from said transformer to D.C. power for supplying power to an external medical device requiring D.C. input power.

4. The power module of claim 3 further comprising a D.C. receptacle coupled to said conversion circuitry to supply power to a device requiring D.C. power.

5. The power module of claim 2 further comprising an electrical storage device electrically coupled to said secondary side of said transformer, said storage device for storing power delivered from said transformer and supplying power to an external medical device to run said device when said input power circuitry is disconnected from said supply source.

6. The power module of claim 5, wherein said electrical storage device is a battery.

7. The power module of claim 5, further comprising a charging device electrically connected between the secondary side of said transformer and said storage device to convert power delivered from said transformer to a power form that can be stored by said storage device.

8. The power module of claim 7, wherein said secondary side of said transformer supplies A.C. power and said charging device converts the A.C. power output from said transformer to D.C. power, said storage device being a D.C. battery for storing said D.C. power from said charging device.

9. The power module of claim 5 wherein the electrical storage device is electrically coupled to a D.C. receptacle, the D.C. receptacle to receive a D.C. plug from an external medical device so that the device may be powered from the storage device.

10. The power module of claim 5, wherein the storage device is electrically coupled to the output receptacle to supply power to an external medical device.

11. The power module of claim 1 further comprising a circuit breaking mechanism electrically connected between said input power circuitry and said isolation circuitry, said circuit breaking mechanism having an internal current limit so that it electrically disconnects said input power circuitry from said isolation circuitry when the amount of current delivered from said input power circuitry to said isolation circuitry surpasses said internal current limit.

12. The power module of claim 1 further comprising a ground fault detector connected between said input power circuitry and said isolation circuitry for sensing the loss of ground potential, the ground fault detector electrically disconnecting the input power circuitry from the isolation circuitry upon sensing the loss of ground potential in said input power circuitry.

13. The power module of claim 1 further comprising a current meter to sense the amount of current passing through said module.

14. The power module of claim 13 said current meter including an indicator to indicate that the amount of current passing through said module is above a predetermined level and that external medical devices should be unplugged from said output receptacle.

15. The power module of claim 1, said output receptacle including a three prong female receptacle for receiving a three pronged male electrical connector plug from an external medical device to connect said medical device to the power module.

16. A method of powering external medical devices from a motorized hospital bed including motor control circuitry for moving the bed, a ground line and a bed frame connected to said ground line, the method comprising:

coupling a supply source of A.C, power with an input power circuit positioned on the bed and coupled to said ground line;

coupling at least one output receptacle to the input power circuit, the receptacle configured to received a plug from an external medical device separate from the motor control circuitry;

plugging a power cord of an external medical device into the receptacle to power the external device through the input power circuit, the medical device being separate from the motor control circuitry and generating leakage current;

coupling an electrical isolation circuit between the input power circuit and the receptacle to effectively electrically isolate said leakage current from reaching the input power circuit and ground line and to effectively prevent external medical device leakage current from traveling through the bed frame;

whereby external medical devices may be powered directly from a bed power supply without significantly increasing the leakage current on the bed frame and the risk of shock to the patient due to the leakage current of the external device.

17. The method of claim 16 further comprising coupling the motor control circuitry of the motorized bed to the input power circuit to power the control circuitry therefrom.

18. The method of claim 16 wherein the step of coupling an electrical isolation circuit includes connecting a primary side of an isolation transformer to the input power circuit and a secondary side of the isolation transformer to the output receptacle so that the transformer effectively prevents leakage current from reaching the ground line of the input power circuit and the bed frame.

* * * * *

UNITED STATES PATENT AND TRADEMARK OFFICE
CERTIFICATE OF CORRECTION

PATENT NO. : 5,398,149

DATED : March 14, 1995

INVENTOR(S) : Paul R. Weil

It is certified that error appears in the above-identified patent and that said Letters Patent is hereby corrected as shown below:

Column 6, line 2, after the word "of", delete "the bed; and"

Column 6, line 3, after the word "move", insert --the bed; and--.

Signed and Sealed this

Thirteenth Day of June, 1995

Attest:

Bruce Lehman

BRUCE LEHMAN

*Attesting Officer* *Commissioner of Patents and Trademarks*